US011541957B2

United States Patent
Pittens et al.

(10) Patent No.: US 11,541,957 B2
(45) Date of Patent: Jan. 3, 2023

(54) ANGLE ADAPTOR FOR BICYCLE HEAD TUBE

(71) Applicant: Nine Point Eight Inc., Ancaster (CA)

(72) Inventors: Jacobus Josef Pittens, Waterdown (CA); John Douglas Duffett, Hamilton (CA)

(73) Assignee: NINE POINT EIGHT INC., Ancaster (CA)

( * ) Notice: Subject to any disclaimer, the term of this patent is extended or adjusted under 35 U.S.C. 154(b) by 44 days.

(21) Appl. No.: 17/332,549

(22) Filed: May 27, 2021

(65) Prior Publication Data

US 2021/0371043 A1 Dec. 2, 2021

Related U.S. Application Data

(60) Provisional application No. 63/030,432, filed on May 27, 2020.

(51) Int. Cl.
| | | |
|---|---|---|
| *B62K 21/22* | (2006.01) | |
| *B62K 21/06* | (2006.01) | |
| *B62K 21/02* | (2006.01) | |

(52) U.S. Cl.
CPC .............. *B62K 21/22* (2013.01); *B62K 21/02* (2013.01); *B62K 21/06* (2013.01)

(58) Field of Classification Search
CPC ......... B62K 21/22; B62K 21/02; B62K 21/06
USPC .......................................................... 280/270
See application file for complete search history.

(56) References Cited

U.S. PATENT DOCUMENTS

| | | | | |
|---|---|---|---|---|
| 7,093,844 | B2 * | 8/2006 | Horiuchi ................ | B62K 19/32 |
| | | | | 280/279 |
| 7,793,958 | B2 * | 9/2010 | Lagar ..................... | B62K 21/22 |
| | | | | 280/281.1 |
| 8,292,316 | B2 * | 10/2012 | Lin ........................ | B62K 21/22 |
| | | | | 280/280 |
| 9,079,631 | B1 * | 7/2015 | Costa ..................... | B62K 21/22 |
| 2012/0153595 | A1 | 6/2012 | Lin | |
| 2021/0031864 | A1 | 2/2021 | Prater | |
| 2021/0362798 | A1 * | 11/2021 | Robinson ............... | B62K 21/06 |
| 2022/0185419 | A1 * | 6/2022 | Costa ..................... | B62K 21/04 |

FOREIGN PATENT DOCUMENTS

| | | | |
|---|---|---|---|
| DE | 202017007497 U1 * | 3/2022 | |
| EP | 3388321 A1 | 10/2018 | |
| GB | 1412509 A | 11/1975 | |

OTHER PUBLICATIONS

"Understanding Bicycle Frame Geometry," Cyclingabout, https://www.cyclingabout.com/; Oct. 4, 2013, pp. 1-21.
Angleset Installation Guide—ZS49-ZS49; Cane Creek Cycling; www.canecreek.com/tech-center; date undetermined, pp. 1-2.
Angleset Installation Guide—EC44|EC49; Cane Creek Cycling; www.canecreek.com/tech-center; date undetrmined, pp. 1-2.
Combined Search and Examination Report for Application No. GB2107539.5 dated Nov. 15, 2021.

(Continued)

*Primary Examiner* — Jacob D Knutson
*Assistant Examiner* — Hosam S Shabara
(74) *Attorney, Agent, or Firm* — Sean Mellino (57) ABSTRACT

An angle adaptor for an integrated system (IS) bicycle frame head tube allows a user to change the effective head tube angle, and thus the fork trail, for a bicycle.

14 Claims, 8 Drawing Sheets

(56) References Cited

OTHER PUBLICATIONS

"Slackerizer Angle Headset-2 Degree-UK Made" by Superstar Components. Undated. https://www.superstarcomponents.com/en/slackerizer-angle-headset.htm. Accessed May 11, 2021.

* cited by examiner

ANGLE ADAPTOR FOR BICYCLE HEAD TUBE

This application claims the benefit of and/or priority to U.S. Provisional Patent application Ser. No. 63/030,432 entitled "ANGLE ADAPTOR FOR BICYCLE HEAD TUBE" filed on May 27, 2020, the entirety of which is incorporated by reference herein.

TECHNICAL FIELD

The present disclosure relates to bicycles, and more particularly to adjustment of the effective head tube angle for a bicycle.

BACKGROUND

In bicycling, the head tube is the part of the bicycle frame that rotatably receives the fork tube (also called the steerer tube). The fork tube carries the handlebars at its upper end and at its lower end carries the fork (which in turn carries the front wheel).

The head tube angle is the angle of the head tube relative to even ground, and will define the axis of rotation for the fork tube, which is the steering axis. The fork rake (or offset) is the distance between the fork arms and the steering axis. The "fork trail", which provides an indication of how fast a bicycle will steer, is a function of the fork rake, the head tube angle and the radius of the front wheel. Less trail corresponds to faster steering, and more trail will result in slower steering, Either faster or slower steering may be desirable, depending on the context and the rider's preference. Thus, the head tube angle affects the steering characteristics of a bicycle, and the head tube angle affects other aspects of bicycle handling as well.

There are a number of different standards for bicycle head tubes. One such standard is the integrated system (IS) head tube, in which the bearings that support the fork tube are largely internal. The IS standard includes IS41, IS42 and IS52. While it would be desirable to be able to modify the effective head tube angle for a bicycle having an IS head tube, the structure and configuration of the IS head tube design make this challenging.

SUMMARY

Broadly speaking, the present disclosure is directed to an angle adaptor for an integrated system (IS) bicycle frame head tube which allows a user to change the effective head tube angle, and thus the fork trait.

In one aspect, an angle adaptor for a bicycle frame head tube comprises a stem side insert tube and a fork side insert tube. The stem side insert tube has a stem side insert tube bearing end and a stem side insert tube insertion end, which is adapted to be received in a stem end of an integrated system (IS) bicycle frame head tube. At the stem side insert tube bearing end, the stem side insert tube has an annular stem side insert support shoulder on its outer surface, with the stem side insert support shoulder being adapted to engage with an annular stem side head tube bearing seat on an inner surface of the IS head tube, and an annular stem side insert bearing shoulder forming a stem side insert bearing seat adapted to receive a stem side bearing. The stem side insert bearing shoulder is axially eccentric from the stem side insert support shoulder. The stem side insert bearing seat defines a stem side insert bearing rotation plane for the stem side bearing when the same is seated in the stem side insert bearing seat. The fork side insert tube has a fork side insert tube bearing end and a fork side insert tube insertion end, which is adapted to be received in a fork end of the IS head tube. At the fork side insert tube bearing end, the fork side insert tube has an annular fork side insert support shoulder on its outer surface, with the fork side insert support shoulder being adapted to engage with an annular fork side head tube bearing seat on the inner surface of the IS head tube, and an annular fork side insert bearing shoulder forming a fork side insert bearing seat adapted to receive a fork side bearing. The fork side insert bearing shoulder is axially eccentric from the fork side insert support shoulder. The fork side insert bearing seat defines a fork side insert bearing rotation plane for the fork side bearing when the same is seated in the fork side insert bearing seat. The stem side insert bearing rotation plane and the fork side insert bearing rotation plane are substantially parallel and concentric with one another so as to define an insert rotation axis.

The angle adaptor may further comprise a connector acting between the stem side insert tube and the fork side insert tube to, when the stem side insert tube is received in the stem end of the IS head tube and the fork side insert tube is received in the fork end of the IS head tube, urge the stem side insert support shoulder against the stem side head tube bearing seat on the IS head tube and urge the annular fork side insert support shoulder against the fork side head tube beating seat on the IS head tube.

The stem side insert tube insertion end of the stem side insert tube may be threaded in a first thread direction, the fork side insert tube insertion end of the fork side insert tube may be threaded in a second thread direction, and the connector may comprise a tensioner tube having a first end threaded in the first thread direction to threadingly engage the stem side insert tube insertion end of the stem side insert tube and a second end threaded in the second direction to threadingly engage the fork side insert tube insertion end of the fork side insert tube. In such an embodiment, upon threaded engagement of the first end of the tensioner tube with the stem side insert, tube insertion end of the stem side insert tube and of the second end with the fork side insert tube insertion end of the fork side insert tube, rotation of the tensioner tube in a first circumferential direction advances the stem side insert tube and the fork side insert tube toward one another and rotation of the tensioner tube in a second circumferential direction opposite the first circumferential direction retreats the stem side insert tube and the fork side insert tube away from one another.

In one embodiment, the insert rotation axis is angularly offset by more than 0° and less than about 3° and in a particular embodiment, the insert rotation axis is angularly offset by between about 1.11° and about 1.86° from a head tube rotation axis defined by the stem side head tube bearing seat and the fork side head tube bearing seat of the head tube. In a more particular embodiment, the insert rotation axis is angularly offset by between about 1.4° and about 1.6° from the head tube rotation axis. In one specific embodiment, the insert rotation axis is angularly offset by about 1.44° from the head tube rotation axis. In another specific embodiment, the insert rotation axis is angularly offset by about 1.5° from the head tube rotation axis. These are merely examples and are not intended to be limiting.

In some embodiments, the stem side insert bearing shoulder forming the stem side insert, bearing seat is adapted to receive an IS-compatible stem side bearing. In some embodiments, the fork side insert bearing shoulder forming the fork side insert bearing seat is adapted to receive an IS-compatible fork side bearing.

In some embodiments, the stem side insert bearing shoulder forming the stem side insert bearing seat is frustoconical with a 45° slope. In some embodiments, the fork side insert bearing shoulder forming the fork side insert bearing seat is frustoconical with a 45° slope.

BRIEF DESCRIPTION OF THE DRAWINGS

These and other features will become more apparent from the following description in which reference is made to the appended drawings wherein.

DETAILED DESCRIPTION

Figure 1:
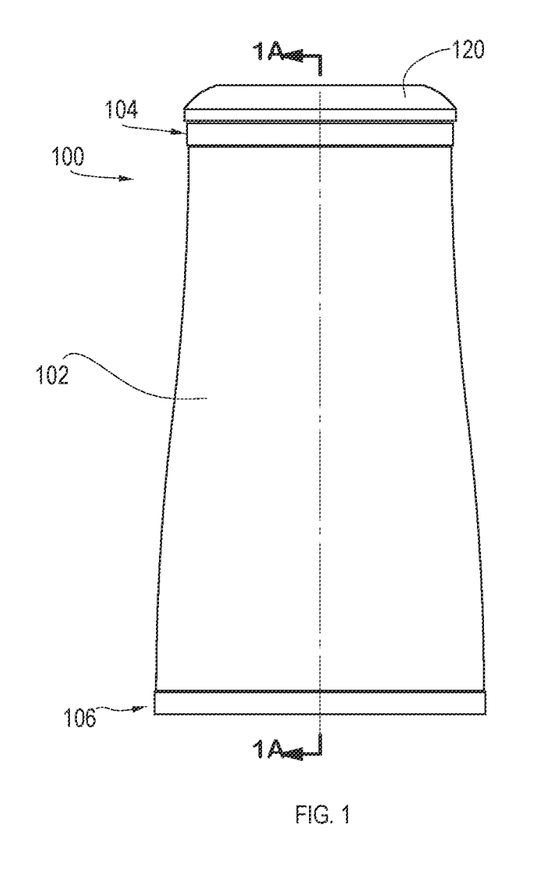
FIG. 1 is a side elevation view of an illustrative integrated system (IS) bicycle frame head tube.
Figure 1A:
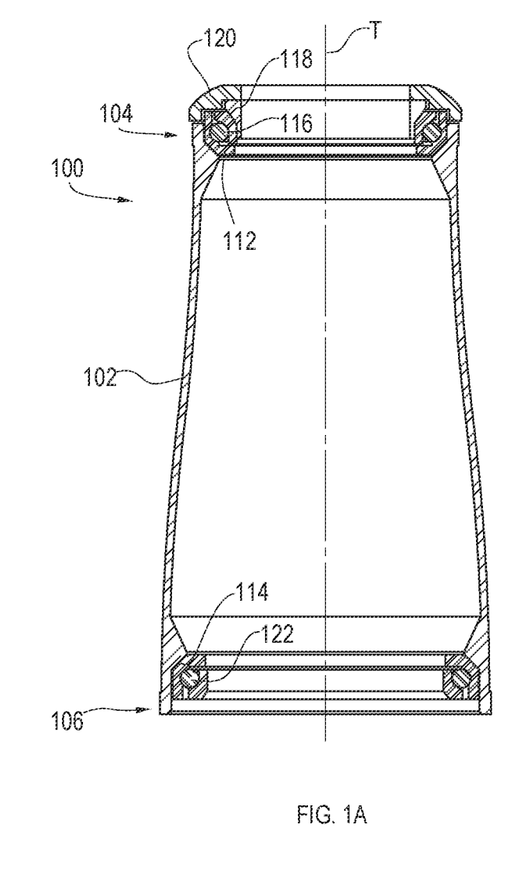
FIG. 1A is a cross-sectional view of the head tube of FIG. 1, taken along the line 1A-1A in FIG. 1.

Reference is now made to FIGS. 1 and 1A, which show an illustrative integrated system (IS) bicycle frame head tube, indicated generally by reference 100, in side view (FIG. 1) and side cross-sectional view (FIG. 1A). Reference is also made to the exploded cross-sectional view of the head tube 100 shown in FIG. 12. The remainder of the bicycle frame is omitted from the drawings for simplicity of illustration.

Figure 12:
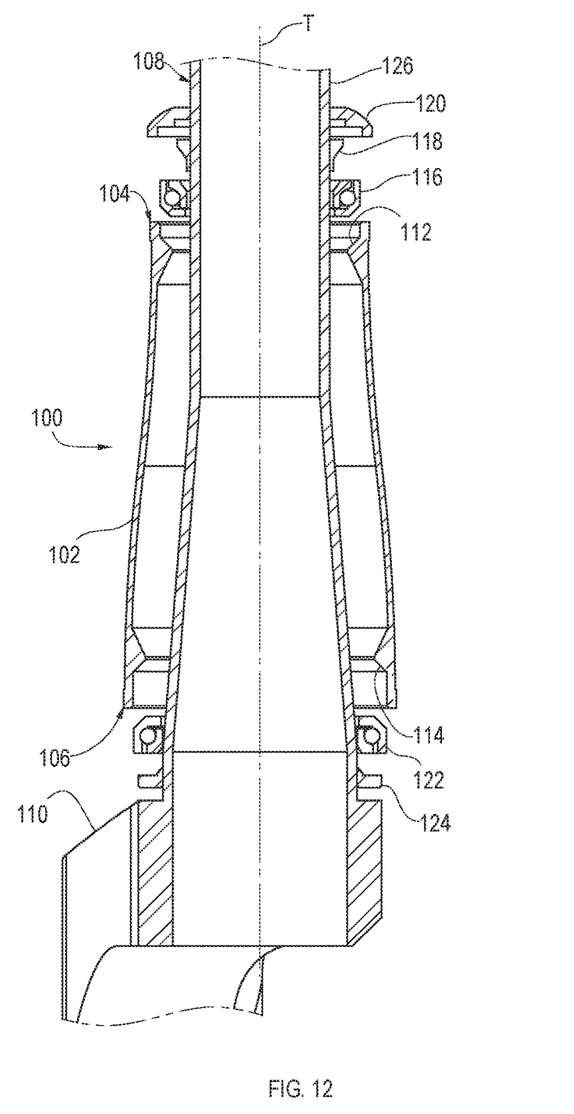
FIG. 12 is an exploded cross-sectional view of the head tube of FIG. 1 with a bicycle fork tube installed therein.

The head tube 100 comprises a hollow, tapering main body 102 which has a stem end 104 and a fork end 106 and is adapted to receive a fork tube 108, as shown in FIG. 12, with the fork crown 110 of the fork tube 108 disposed at the fork end 106 of the main body 102.

The head tube 100 has an annular stem side head tube bearing seat 112 formed on the inner surface of the main body 102 and also has an annular fork side head tube bearing seat 114 formed on the inner surface of the main body 102. The stem side head tube bearing seat 112 receives an IS stem side bearing 116 (also referred to as a headset upper bearing), which in turn receives a headset bearing wedge ring 118 and an annular headset dust cover 120. Similarly, the fork side head tube bearing seat 114 receives an IS fork side bearing 122 (also referred to as a headset lower bearing) and a crown race 124 (see FIG. 12).

As can be seen, the head tube 100 is generally symmetrical and has a head tube rotation axis T defined by the stem side head tube bearing seat 112 and the fork side head tube bearing seat 114 of the head tube 100. The stem side head tube bearing seat 112, stem side bearing 116, fork side head tube bearing seat 114 and fork side bearing 122 cooperate to allow the fork tube 108 to rotate within the main body 102 about the head tube rotation axis T. The stem end 126 of the fork tube 108, which will carry the handlebar assembly (not shown) projects upwardly from the stem end 104 of the head tube 100.

Reference is now made to FIGS. 2 to 9, which show an illustrative embodiment of an angle adaptor according to the present disclosure, indicated generally by reference 200. The angle adaptor 200 comprises a stem side insert tube 202, a fork side insert tube 204 and, in the illustrated embodiment, a connector 206.

Figure 2:
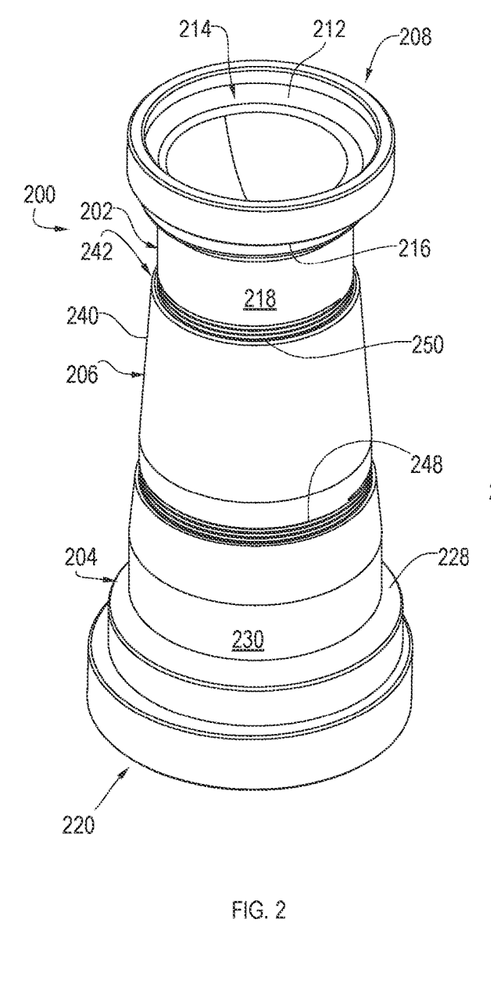
FIG. 2 is a top isometric view of an illustrative angle adaptor according to the present disclosure.
Figure 3:
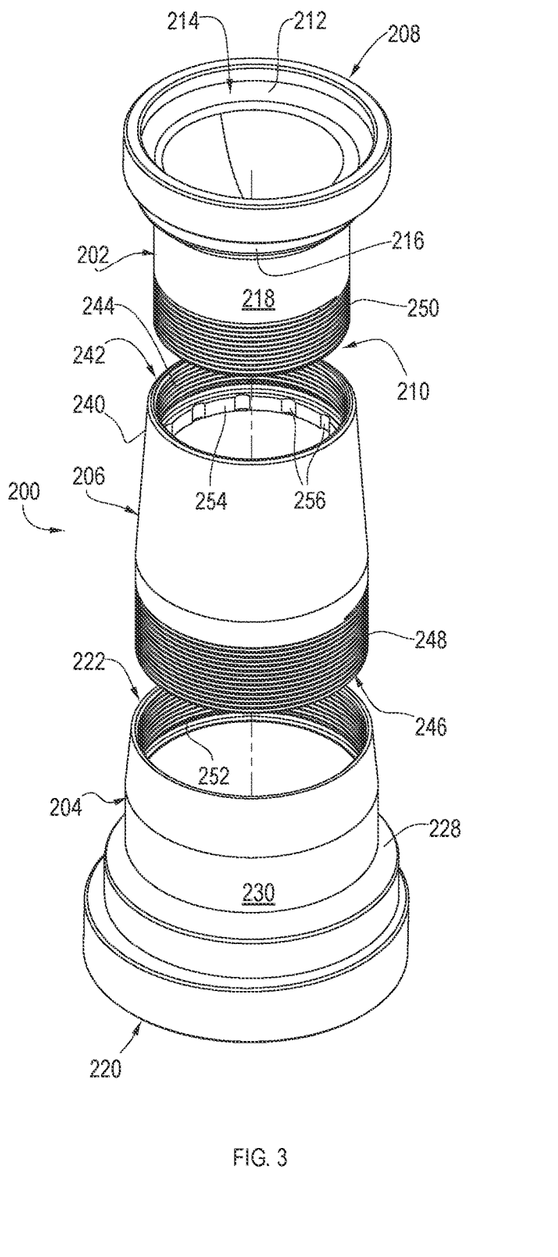
FIG. 3 is an exploded top isometric view of the angle adaptor of FIG. 2.
Figure 4:
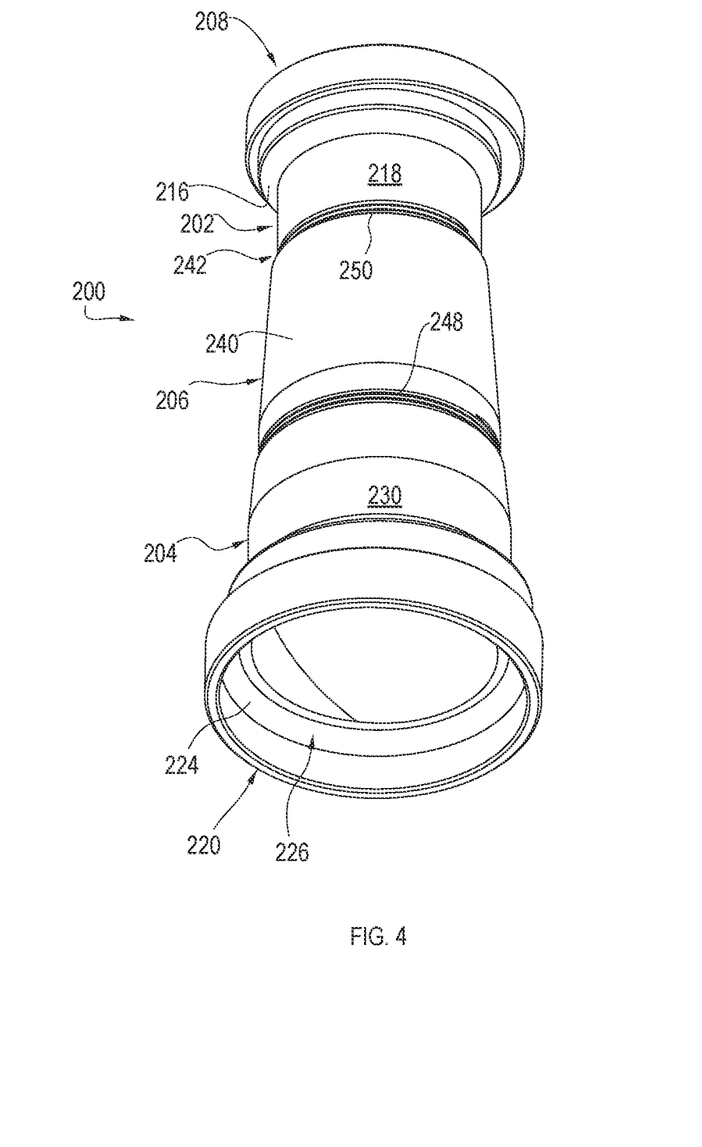
FIG. 4 is a bottom isometric view of the angle adaptor of FIG. 2.
Figure 5:
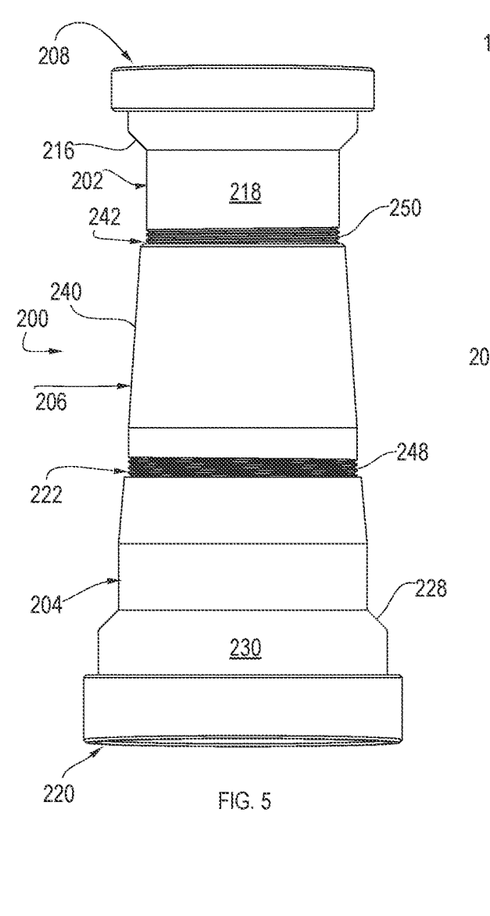
FIG. 5 is a front elevation view of the angle adaptor of FIG. 2.
Figure 5A:
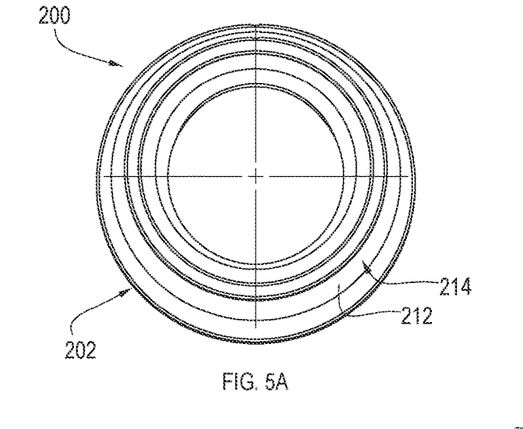
FIG. 5A is a top plan view of the angle adaptor of FIG. 2.
Figure 6:
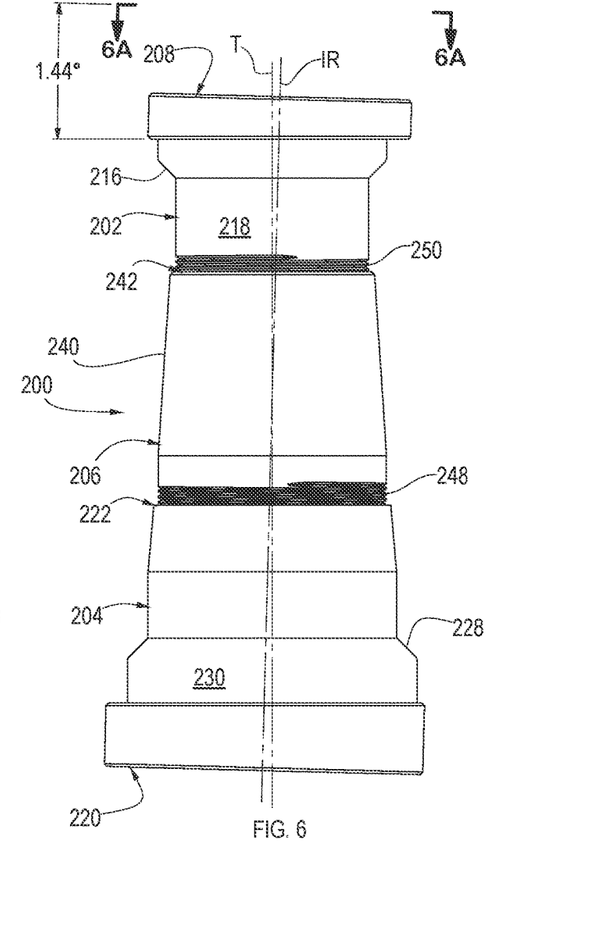
FIG. 6 is a left side elevation view of the angle adaptor of FIG. 2.
Figure 6A:
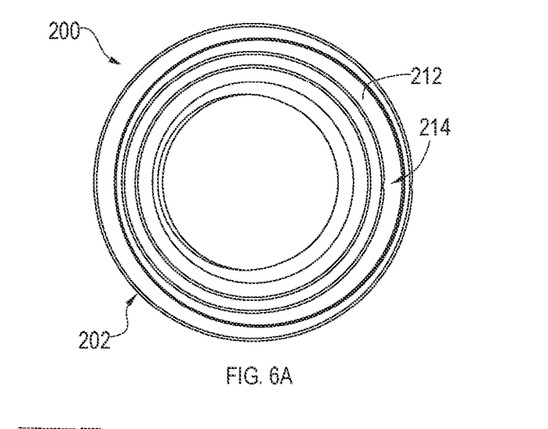
FIG. 6A is a view of the angle adaptor of FIG. 2, taken along the line 6A-6A in FIG. 6.
Figure 7:
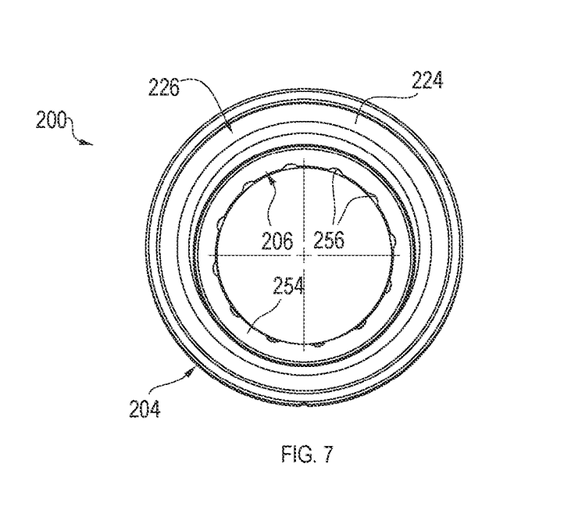
FIG. 7 is a bottom plan view of the angle adaptor of FIG. 2.
Figure 8:
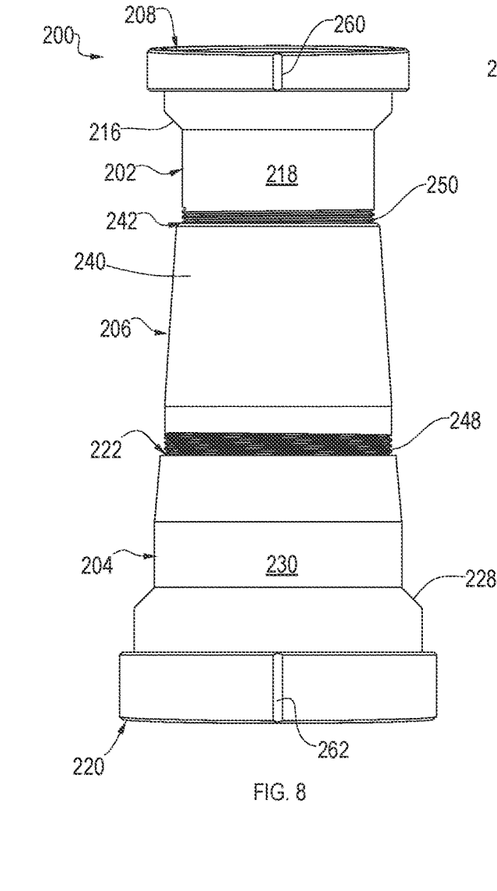
FIG. 8 is a rear elevation view of the angle adaptor of FIG. 2.
Figure 9:
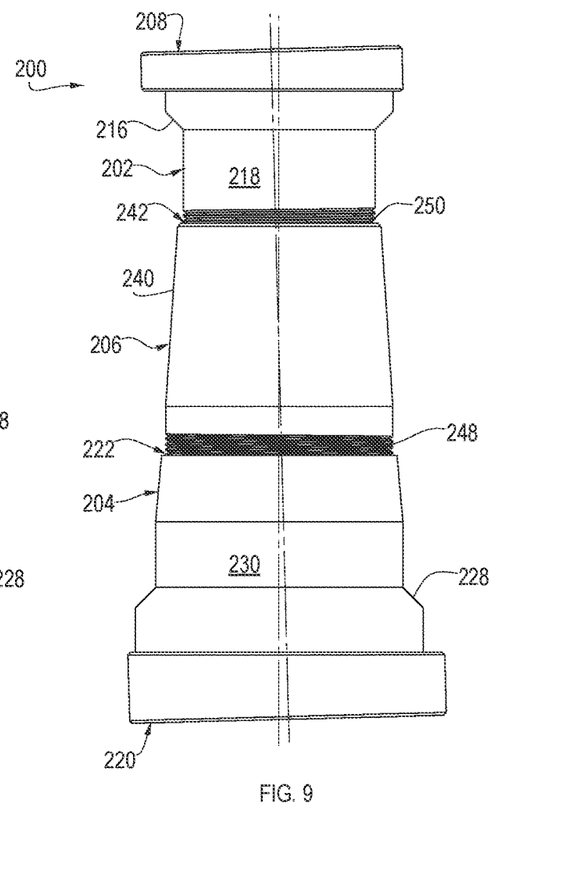
FIG. 9 is a right side elevation view of the angle adaptor of FIG. 2.

The stem side insert tube 202 has a stem side insert tube bearing end 208 and a stem side insert tube insertion end 210. The stem side insert tube insertion end is adapted to be received in a stem end of an integrated system (IS) bicycle frame head tube (e.g. stem end 104 of head tube 100). An annular stem side insert bearing shoulder 212 is disposed at the stem side insert tube bearing end 208 and forms a stem side insert bearing seat 214 adapted to receive an IS-compatible stem side bearing (e.g. IS stem side bearing 116). The term "IS-compatible", as used in respect of bearings, includes not only bearings which are technically compliant to the IS standard, but also any bearing that will suitably outwardly engage the bearing seat of an IS head tube and suitably inwardly receive a fork tube (even if the bearing is not technically compliant with the IS standard). The term "IS-compatible" also encompasses the combination of a bearing with an adaptor to fit the bearing to an IS bearing seat; the assembly of bearing and adaptor would together be considered an IS-compatible bearing. Thus, in the illustrated embodiment the stem side insert bearing shoulder 212 is frustoconical with a 45° slope. However, this is merely one illustrative embodiment. In other embodiments, the stem side insert bearing shoulder and the stem side insert bearing seat may be adapted to receive another type of bearing, for example the stem side insert tube bearing end may have a suitable straight bore and top square shoulder to form a bearing seat adapted to accept a ZS bearing or another external headset bearing, rather than an IS-compatible bearing. Opposite the stem side insert bearing seat 214 and inwardly thereof at the stem side insert tube bearing end 208, the stem side insert tube 202 has an annular stem side insert support shoulder 216 on its outer surface 218. The stem side insert support shoulder 216 is adapted to engage with an annular stem side head tube bearing seat (e.g. stem side head tube bearing seat 112) on an inner surface of the head tube (e.g. head tube 100) and thus in the illustrated embodiment is frustoconical with a 45° slope. While the illustrated embodiment shows a continuous shoulder, a discontinuous annular shoulder (e.g. a toothed shoulder) is also contemplated. The stem side insert bearing seat 214 will define a stem side insert bearing rotation plane for the stem side bearing (e.g. IS stem side bearing 116) when the same is seated in the stem side insert bearing seat 214. A "bearing rotation plane" for a bearing is a notional plane that transects the bearing and is normal to the axis of rotation for the bearing.

Importantly, and in fact critically, the stem side insert bearing shoulder 212 is axially eccentric from the stem side insert support shoulder 216. The term "axially eccentric", as used herein in reference to the insert bearing shoulders and the insert support shoulders, excludes an arrangement case where the shoulders are parallel to one another and merely laterally offset. Thus, the stem side insert bearing shoulder 212 and the stem side insert support shoulder 216 will each define a respective central axis, and because the shoulders are axially eccentric from one another these central axes will be non-parallel to (and non-coincident with) one another.

The fork side insert tube 204 has a fork side insert tube bearing end 220 and a fork side insert tube insertion end 222. The fork side insert tube insertion end 222 is adapted to be received in a fork end of an IS bicycle frame head tube (e.g. fork end 106 of head tube 100). An annular fork side insert bearing shoulder 224 is disposed at the fork side insert tube bearing end 220 and forms a fork side insert bearing seat 226 adapted to receive an IS-compatible fork side bearing (e.g. IS fork side bearing 122). Thus, in the illustrated embodiment the fork side insert beating shoulder 224 is frustoconical with a 45° slope. Again, this is merely one illustrative embodiment, and in other embodiments, the fork side insert bearing shoulder and the fork side insert bearing seat may be adapted to receive another type of bearing, for example a ZS bearing or another external headset bearing. Opposite the fork side insert bearing seat 226 and inwardly thereof at the fork side insert tube bearing end 220, fork side insert tube 204 has an annular fork side insert support shoulder 228 on its outer surface 230. The fork side insert support shoulder 228 is adapted to engage with an annular fork side head tithe bearing seat (e.g. fork side head tube bearing seat 114) on the inner surface of an IS head tube (e.g. head tube 100) and thus in the illustrated embodiment is frustoconical with a 45° slope. While the illustrated embodiment shows a continuous shoulder, a discontinuous annular shoulder (e.g. a toothed shoulder) is also contemplated. The fork side insert bearing seat 226 will define a fork side insert bearing rotation plane for the fork side bearing (e.g. IS fork side bearing 122) when the same is seated in the fork side insert bearing seat 226. As noted above, a "bearing rotation plane" for a bearing is a notional plane that transects the bearing and is normal to the axis of rotation for the bearing.

Importantly, and in fact critically, the fork side insert bearing shoulder 224 is axially eccentric from the fork side insert support shoulder 228. Again, the term "axially eccentric" excludes an arrangement in which the respective insert bearing shoulder and insert support shoulder of an insert tube are parallel to one another and merely laterally offset. Thus, the fork side insert bearing shoulder 224 and the fork side insert support shoulder 228 will each define a respective central axis, and, since the shoulders are axially eccentric from one another, these central axes will be non-parallel to (and non-coincident with) one another.

As noted above, in the illustrated embodiment the angle adaptor 200 comprises a connector 206. The connector 206 acts between the stem side insert tithe 202 and the fork side insert tube 204. When the stem side insert tube 202 is received in the stem end 104 of the head tube 100 and the fork side insert tube 204 is received in the fork end 106 of the head tube 100, the connector 206 can urge the stem side insert support shoulder 216 against the stem side head tube bearing seat 112 on the head tube 100 and urge the fork side insert support shoulder 228 against the fork side head tube bearing seat 114 on the head tube 100.

Figures 13, 14, 15, 16:
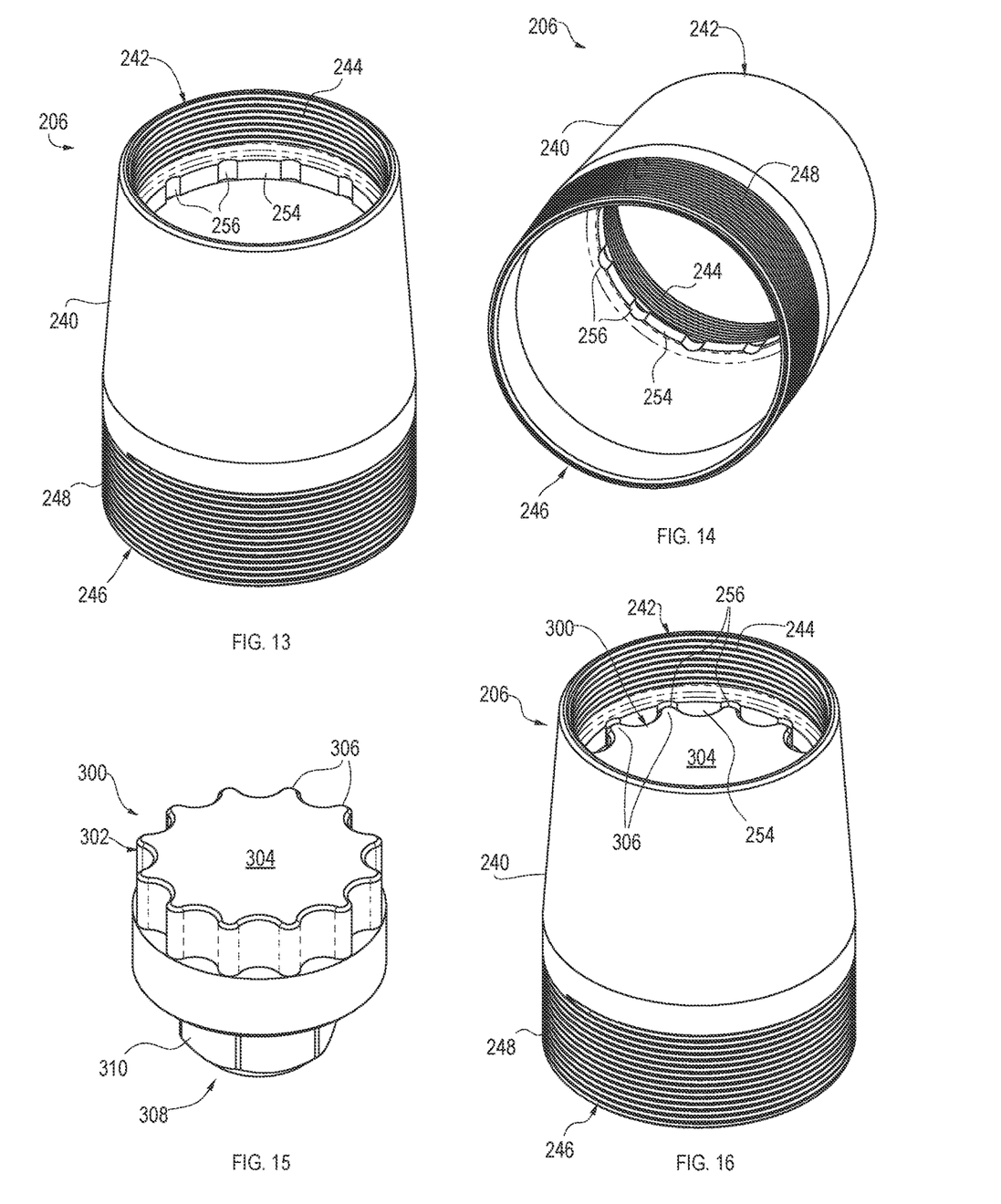
FIG. 13 is a top isometric view of a connector tube of the angle adaptor of FIG. 2.
FIG. 14 is a bottom isometric view of the connector tube of FIG. 13.
FIG. 15 is a top perspective view of a specialized tool for rotating the connector tube of FIG. 13.
FIG. 16 is a top perspective view specialized tool of FIG. 15 interfitted with the connector tube of FIG. 13.

As best seen in FIGS. 13 and 14, the illustrated connector 206 comprises a hollow, partially cylindrical and partially frustoconical tensioner tube 240 having a frustoconical first end 242 internally threaded with threads 244 running in a first thread direction and a cylindrical second end 246 externally threaded with threads 248 running in a second thread, direction; the first and second thread directions are opposite to one another.

Figure 10:
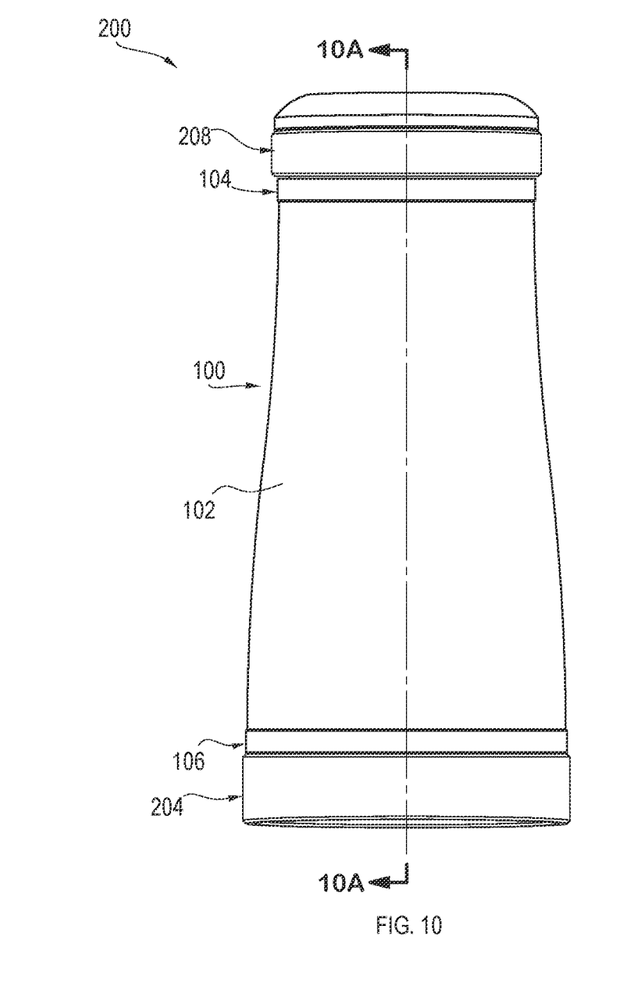
FIG. 10 is a front elevation view of an assembly comprising the angle adaptor of FIG. 2 assembled together with the head tube of FIG. 1.
Figure 10A:
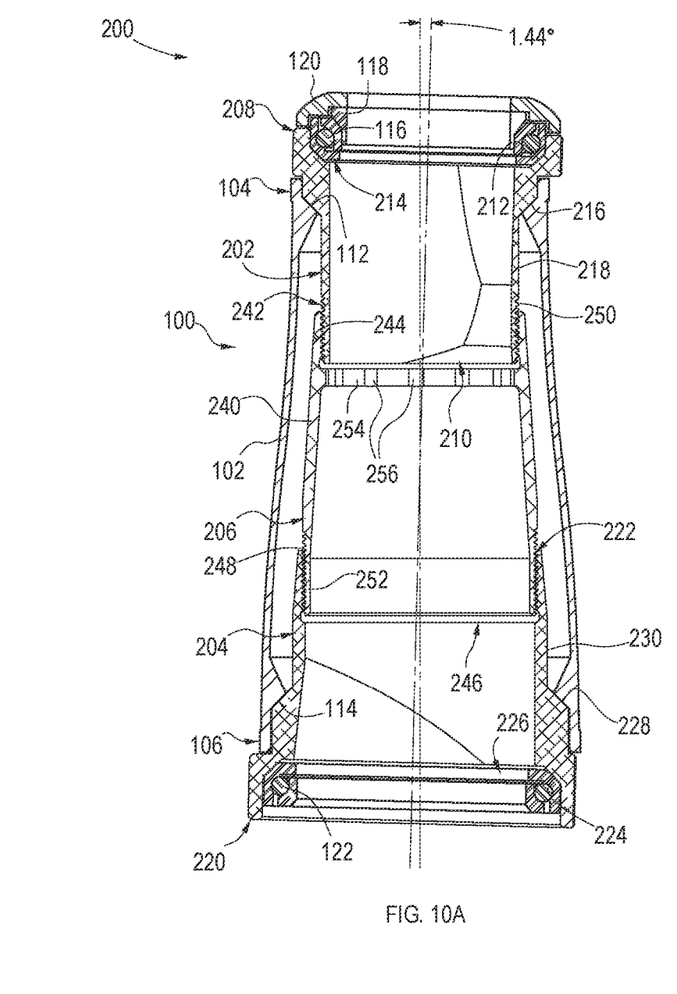
FIG. 10A is a cross-sectional view of the assembly of FIG. 10, taken along the line 10A-10A in FIG. 10.
Figure 11:
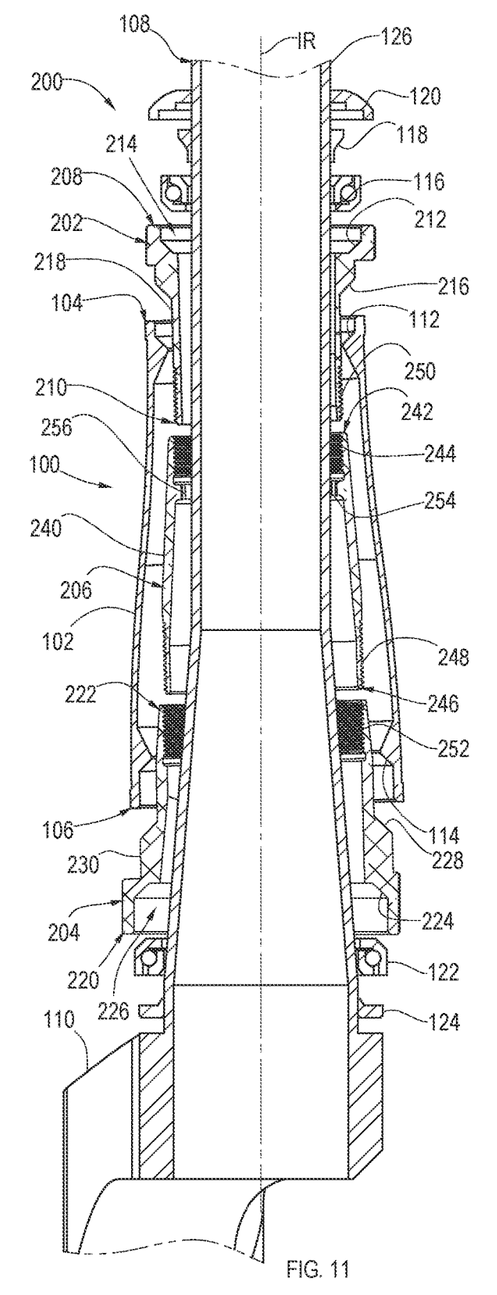
FIG. 11 is an exploded cross-sectional view of the assembly of FIG. 10 with a bicycle fork tube installed therein.

Reference is now made specifically to FIGS. 3, 10A and 11. The stem side insert tube insertion end 208 of the stem side insert tube 202 is externally threaded by threads 250 running in the first thread direction; these threads 250 are threadedly interengageable with the internal threads 244 on the first end 242 of the tensioner tube 240. Similarly, the fork side insert tube insertion end 222 of the fork side insert tube 204 is internally threaded in the second thread direction; these threads 252 are threadedly interengageable with the external threads 248 on the second end 246 of the tensioner tube 240. Thus, the first end 242 of the tensioner tube 240 can threadingly engage the stem side insert tube insertion end 208 of the stem side insert tube 202 and the second end 246 of the tensioner tube 240 can threadingly engage the fork side insert tube insertion end 222 of the fork side insert tube 204. It will be appreciated that the particular selection of which portions of each component are internally and externally threaded is merely illustrative and not limiting. For example, in alternate embodiments the first end of the tensioner tube may be externally threaded and the second end may be internally threaded or both ends of the tensioner tube may be externally threaded or both ends may be internally threaded, with corresponding adaptation of the insert tubes, so long as the tensioner tube can threadedly interengage with the insert tubes.

Upon threaded engagement of the first end 242 of the tensioner tube 240 with the stem side insert tube insertion end 208 of the stem side insert tube 202 and of the second end 246 of the tensioner tube 240 with the fork side insert tube insertion 222 end of the fork side insert tube 204, rotation of the tensioner tube 240 in a first circumferential direction advances the stem side insert tube 202 and the fork side insert tube 204 toward one another. When assembled with the head tube 100, this this urges the stem side insert support shoulder 216 against the stem side head tube bearing seat 112 on the head tube 100 and also urges the fork side insert support shoulder 228 against the fork side head tube bearing seat 114 on the head tube 100, as best seen in FIG. 7A. Conversely, rotation of the tensioner tube 240 in a second circumferential direction opposite the first circumferential direction retreats the stem side insert tube 202 and the fork side insert tube 204 away from one another.

To facilitate rotation of the tensioner tube 240 within the main body 102 of the head tube 100, the tensioner tube 240 may be provided with a drive coupling feature. In the illustrated embodiment, the drive coupling feature takes the form of a radially inwardly extending annular flange 254 disposed longitudinally inwardly of the internal threads 244 on the first end 242 of the tensioner tube 240 and having a spline comprising evenly circumferentially spaced rounded notches 256. A specialized tool 300, shown in FIG. 15, may be provided at its first end 302 with a scalloped head 304 whose radially outwardly extending nodes 306 are spaced and configured to engage with the notches 256 and at its second other end 308 with a standard size hex head 310 to engage a correspondingly sized hex socket tool (not shown). This is merely one illustrative example of a drive coupling feature and is not intended to be limiting; other types of drive coupling features are also contemplated.

Moreover, threaded interengagement is merely one illustrative method for engaging the connector with the insert tubes for urging the insert support shoulders against the respective bearing shoulders on an IS head tube and other methods are also contemplated within the scope of the present disclosure.

Installation of the illustrative angle adaptor 200 into the illustrative head tube 100 proceeds as follows. First, if mounted, the handlebar assembly is removed from the stem end 126 of the fork tube 108. The headset dust cover 120 can then be removed from the stem end 104 of the head tube 100. The fork tube 108 can then slide out from the head tube 100 by moving the fork crown 110 of the fork tube 108 away from the fork end 106 of the head tube 100. The crown race 124 is press-fit into the fork crown 110 and so will be normally be removed when the fork tube 108 slides out from the head tube 100. The fork side bearing 122, if it did not come out with the fork tube 108, can be removed from the fork end 106 of the head tube 100 and the stem side bearing 116 and headset bearing wedge ring 118 can be removed from the stem end 104 of the head tube 100, leaving only the main body 102. The fork side insert tube insertion end 222 of the fork side insert tube 204 is threaded into engagement with the second end 246 of the tensioner tube 240, and this assembly is then inserted (tensioner tube 240 leading) into the fork end 106 of the main body 102 of the head tube 100. The stem side insert tube insertion end 210 of the stem side insert tube 202 is then inserted into the stem end 104 of the main body 102 of the head tube 100 and threaded into engagement with the first end 242 of the tensioner tube 240, which may be done by hand. Alternately, the stem side insert tube 202 maybe inserted first, followed by the assembly of the fork side insert tube 204 and the tensioner tube 240, and then threaded into engagement; the order is not significant. Once the stem side insert tube 202, the tensioner tube 240 and the fork side insert tube 204 are threadedly interengaged with one another, the tensioner tube 240 may be rotated within the main body 102 (e.g. using the tool 300 described above, inserted through the fork side insert tube 204) to draw the stem side insert tube 202 and the fork side insert tube 204 toward one another. This brings the stem side insert support shoulder 216 into tight engagement with the stem side head tube bearing seat 112 and likewise brings the fork side insert support shoulder 228 into tight engagement with the fork side head tube bearing seat 114. The stem side insert tube 202, the tensioner tube 240 and the fork side insert tube 204 are thus nested in the main body 102. Alignment markings 260, 262 on the stem side insert tube 202 and the fork side insert tube 204 are provided to ensure that the stem side insert tube 202 and the fork side insert tube 204 are properly aligned with the bicycle frame (not shown), While the illustrated embodiment has the tool 300 inserted through the fork side insert tube 204, embodiments in which the tool is to be inserted through the stem side insert tube, or through either the fork side insert tube or the stem side insert tube, are also contemplated.

The stem side insert bearing seat 214 is adapted to receive an IS-compatible stem side bearing (e.g. IS stem side bearing 116). Similarly, the fork side insert bearing seat 226 is adapted to receive the IS-compatible fork side bearing (e.g. IS fork side bearing 122). (As noted above, other embodiments may be adapted for other types of bearing). The IS fork side bearing 122 is normally fitted onto the fork tube 108 atop the crown race 124 and installed by sliding the fork tube 108, stem end 126 first, through the fork side insert tube 204, the tensioner tube 240 and the stem side insert tube 202 installed therein. This will seat the IS fork side bearing 122 in the fork side insert bearing seat 226. The IS stem side bearing 116, headset bearing wedge ring 118 and headset dust cover 120 can then be installed at the stem side insert tube bearing end 208 of the stem side insert tube 202 by sliding over the fork tube 108. Optionally, IS stem side bearing 116 could be seated before inserting the fork tube 108. Thus, in one particularly advantageous embodiments, the bearings and related hardware from the original head tube 100, although other bearings may also be used.

As noted above, the stem side insert bearing seat 214 will define a stem side insert bearing rotation plane for the stem side bearing (e.g. IS stem side bearing 116) when the same is seated in the stem side insert bearing seat 214, and similarly the fork side insert beating seat 226 will define a fork side insert bearing rotation plane for the fork side bearing (e.g. IS fork side bearing 122) when the same is seated in the fork side insert bearing seat 226. Critically, the stem side insert bearing rotation plane and the fork side insert bearing rotation plane are substantially parallel and concentric with one another so as to define an insert rotation axis IR. As a consequence of the stem side insert bearing shoulder 212 being axially eccentric from the stem side insert support shoulder 216 and the fork side insert bearing shoulder 224 being axially eccentric from the fork side insert support shoulder 228, the insert rotation axis IR is angularly offset from the head tube rotation axis T of the head tube 100. The term "angularly offset", as used in this context, means that the insert rotation axis IR is non-parallel and non-coincident with the head tube rotation axis T of the head tube 100. Thus, the angle adjuster 200, as its name implies, allows the angle of attack of the fork tube 108 to be adjusted from that provided by the head tube 100 alone. Preferably, the insert rotation axis IR is angularly offset by more than 0° and less than about 3° from the head tube rotation axis T from the head tube rotation axis T, more preferably, the insert rotation axis IR is angularly offset by between about 1.11° and about 1.86° from the head tube rotation axis T, and still more preferably by between about 1.4° and about 1.6° from the head tube rotation axis T. In one particular embodiment, the insert rotation axis IR is angularly offset by about 1.44° from the head tube rotation axis T. In another particular embodiment, the insert rotation axis IR is angularly offset by about 1.5° from the head tube rotation axis T. These are merely illustrative values, and are not intended to be limiting. Moreover, in some embodiments the insert rotation axis IR may be angularly offset by less than 1.11° or by more than 1.86°, and in some cases by more than 3°. It will be appreciated that an angle adjuster according to the present disclosure can be installed to either steepen or slacken the steering head angle.

Certain illustrative embodiments have been described by way of example. It will be apparent to persons skilled in the art that a number of variations and modifications can be made without departing from the scope of the claims.

The following parts list is provided as a reference aid to assist in understanding the illustrated embodiments, and is not to be construed as limiting the scope of the appended claims:

IR Insert rotation axis
T Head tube rotation axis

100 Read tube
102 Main body (of head tube)
104 Stem end (of head tube)
106 Fork end (of head tube)
108 Fork tube
110 Fork crown of fork tube
112 Stem side head tube bearing seat
114 Fork side head tube bearing seat
116 Stem side bearing
118 Headset bearing wedge ring
120 Headset dust cover
122 Fork side bearing
124 Crown race
126 Stem end of fork tube
200 Angle adaptor
202 Stem side insert tube
204 Fork side insert tube
206 Connector
208 Stem side insert tube bearing end
210 Stem side insert tube insertion end
212 Stem side insert bearing shoulder
214 Stem side insert bearing seat
216 Annular stem side insert support shoulder
218 Outer surface (of stem side insert tube)
220 Fork side insert tube bearing end
222 Fork side insert tube insertion end
224 Fork side insert bearing shoulder
226 Fork side insert bearing seat
228 Fork side insert support shoulder
230 Outer surface (of fork side insert tube)
240 Tensioner tube
242 First end (of tensioner tube)
244 Threads (first end of tensioner tube)
246 Second end (of tensioner tube)
248 Threads (second end of tensioner tube)
250 Threads (stem side insert tube)
252 Threads (fork side insert tube)
254 Annular flange
256 Notches
260 Alignment marking (stem side insert tube)
262 Alignment marking (fork side insert tube)
300 Specialized tool
302 First end (specialized tool)
304 Scalloped head
306 Radially outwardly extending nodes
308 Second end (specialized tool)
310 Hex head

What is claimed is:

1. An angle adaptor for a bicycle frame head tube, comprising: a stem side insert tube, wherein: the stem side insert tube has a stem side insert tube bearing end and a stem side insert tube insertion end; the stem side insert tube insertion end is adapted to be received in a stem end of an integrated system (IS) bicycle frame head tube; at the stem side insert tube bearing end, the stem side insert tube has: an outer surface; an annular stem side insert support shoulder on the outer surface, the stem side insert support shoulder being adapted to engage with an annular stem side head tube bearing seat on an inner surface of the IS head tube; an annular stem side insert bearing shoulder forming a stem side insert bearing seat adapted to receive a stem side bearing; the stem side insert bearing shoulder being axially eccentric from the stem side insert support shoulder; the stem side insert bearing seat defining a stem side insert bearing rotation plane for the stem side bearing when the stem side bearing is seated in the stem side insert bearing seat; a fork side insert tube, wherein: the fork side insert tube has a fork side insert tube bearing end and a fork side insert tube insertion end; the fork side insert tube insertion end is adapted to be received in a fork end of the IS head tube; at the fork side insert tube bearing end, the fork side insert tube has: an outer surface; an annular fork side insert support shoulder on the outer surface, the fork side insert support shoulder being adapted to engage with an annular fork side head tube bearing seat on the inner surface of the IS head tube; an annular fork side insert bearing shoulder forming a fork side insert bearing seat adapted to receive a fork side bearing; the fork side insert bearing shoulder being axially eccentric from the fork side insert support shoulder; the fork side insert bearing seat defining a fork side insert bearing rotation plane for the fork side bearing when the fork side bearing is seated in the fork side insert bearing seat;
the stem side insert bearing rotation plane and the fork side insert bearing rotation plane being substantially parallel and concentric with one another so as to define an insert rotation axis.

2. The angle adaptor of claim 1, further comprising a connector acting between the stem side insert tube and the fork side insert tube to, when the stem side insert tube is received in the stem end of the IS head tube and the fork side insert tube is received in the fork end of the IS head tube:
urge the stem side insert support shoulder against the stem side head tube bearing seat on the IS head tube; and
urge the annular fork side insert support shoulder against the fork side head tube hearing seat on the IS head tube.

3. The angle adaptor of claim 2, wherein:
the stem side insert tube insertion end of the stem side insert tube is threaded in a first thread direction;
the fork side insert tube insertion end of the fork side insert tube is threaded in a second thread direction; and
the connector comprises a tensioner tube having a first end threaded in the first thread direction to threadingly engage the stem side insert tube insertion end of the stem side insert tube and a second end threaded in the second direction to threadingly engage the fork side insert tube insertion end of the fork side insert tube;
whereby, upon threaded engagement of the first end of the tensioner tube with the stem side insert tube insertion end of the stem side insert tube and of the second end with the fork side insert tube insertion end of the fork side insert tube:
rotation of the tensioner tube in a first circumferential direction advances the stem side insert tube and the fork side insert tube toward one another; and
rotation of the tensioner tube in a second circumferential direction opposite the first circumferential direction retreats the stem side insert tube and the fork side insert tube away from one another.

4. The angle adaptor of claim 1, wherein the insert rotation axis is angularly offset by more than 0° and less than about 3° from a head tube rotation axis defined by the stem side head tube bearing seat and the fork side head tube bearing seat of the head tube.

5. The angle adaptor of claim 1, wherein the insert rotation axis is angularly offset by between about 1.11° and about 1.86° from a head tube rotation axis defined by the stem side head tube bearing seat and the fork side head tube bearing seat of the head tube.

6. The angle adaptor of claim 1, wherein the insert rotation axis is angularly offset by between about 1.4° and about 1.6° from a head tube rotation axis defined by the stem side head tube bearing seat and the fork side head tube bearing seat of the head tube.

7. The angle adaptor of claim 1, wherein the insert rotation axis is angularly offset by about 1.44° from a head tube rotation axis defined by the stem side head tube bearing seat and the fork side head tube bearing seat of the head tube.

8. The angle adaptor of claim 1, wherein the insert rotation axis is angularly offset by about 1.5° from a head tube rotation axis defined by the stem side head tube bearing seat and the fork side head tube bearing seat of the head tube.

9. The angle adaptor of claim 1, wherein the stem side insert bearing shoulder forming the stem side insert bearing seat is adapted to receive an IS-compatible stem side bearing.

10. The angle adaptor of claim 1, wherein the stem side insert bearing shoulder forming the stem side insert bearing seat is frustoconical with a 45° slope.

11. The angle adaptor of claim 1, wherein the fork side insert bearing shoulder forming the fork side insert bearing seat is adapted to receive an IS-compatible fork side bearing.

12. The angle adaptor of claim 1, wherein the fork side insert bearing shoulder forming the fork side insert bearing seat is frustoconical with a 45° slope.

13. The angle adaptor of claim 1, wherein:
the stem side insert bearing shoulder forming the stem side insert bearing seat is adapted to receive an IS-compatible stem side bearing; and
the fork side insert bearing shoulder forming the fork side insert bearing seat is adapted to receive an IS-compatible fork side bearing.

14. The angle adaptor of claim 1, wherein:
the stem side insert bearing shoulder forming the stem side insert bearing seat is frustoconical with a 45° slope; and
the fork side insert bearing shoulder forming the fork side insert bearing seat is frustoconical with a 45° slope.

* * * * *